April 7, 1959  J. F. STEPHENS  2,880,943
HORIZONTAL BELT MAT WINDING MACHINE
Filed April 27, 1954  3 Sheets-Sheet 1
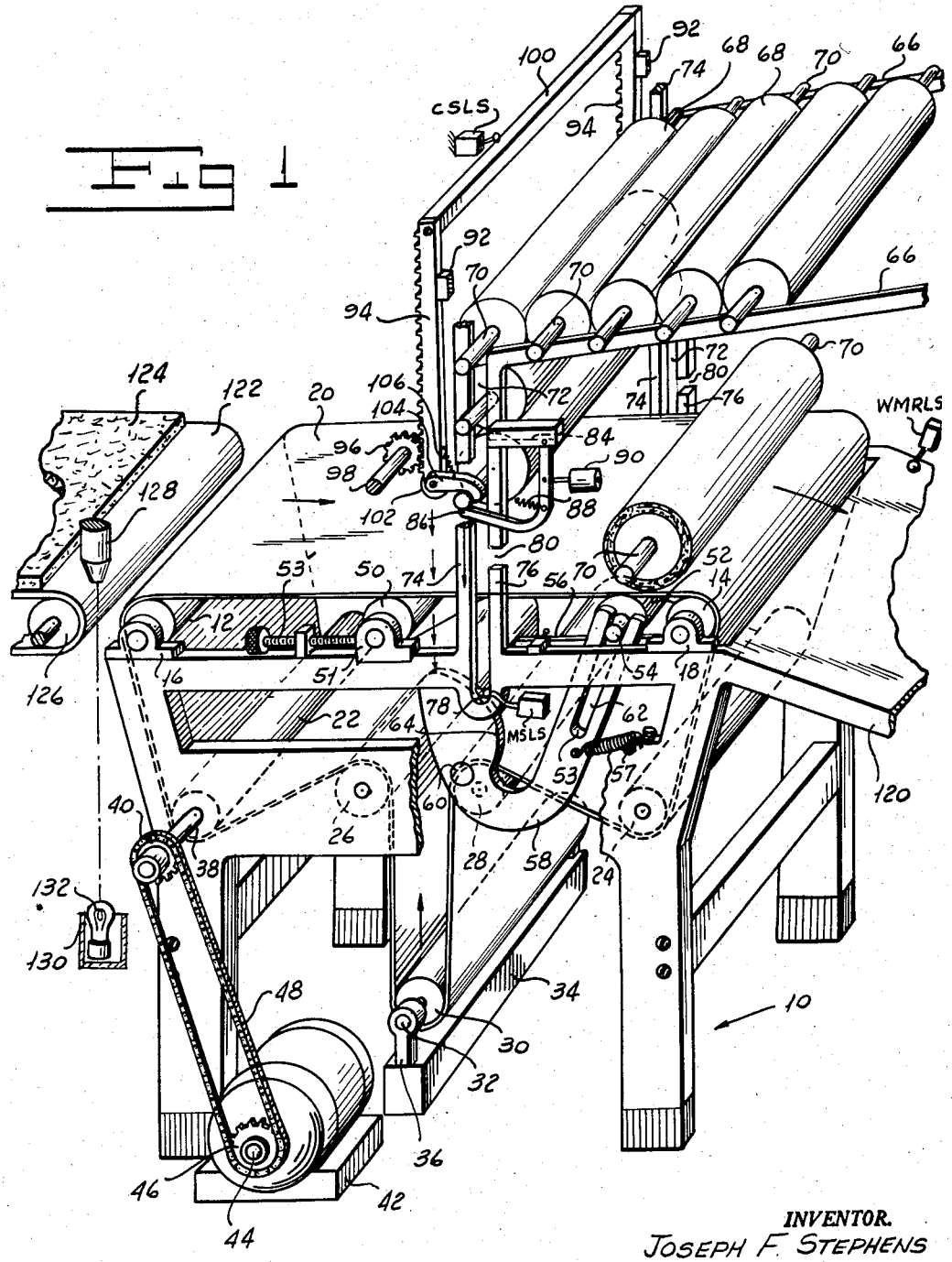
INVENTOR.
JOSEPH F. STEPHENS
BY
ATTORNEY

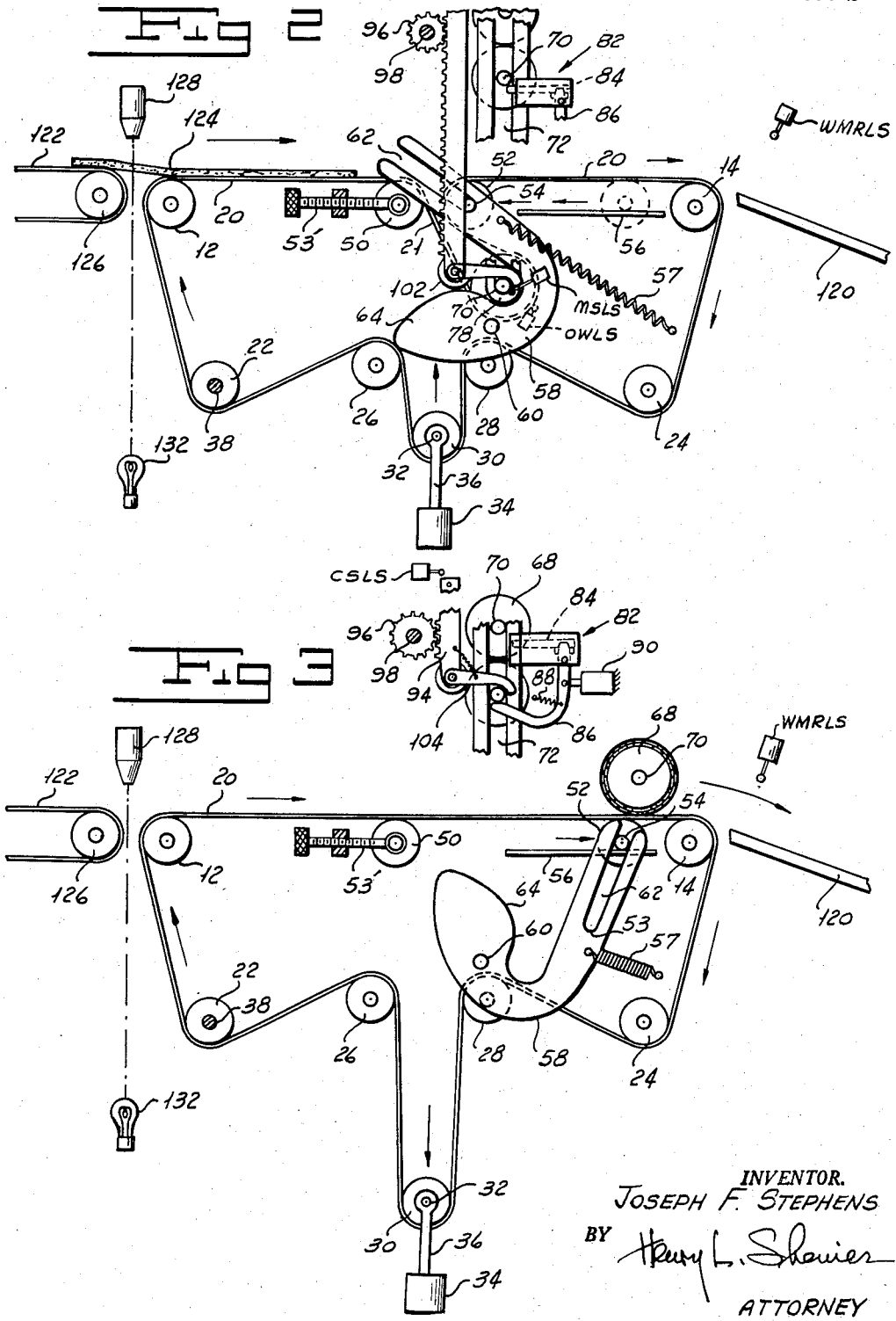

United States Patent Office 2,880,943
Patented Apr. 7, 1959

2,880,943

HORIZONTAL BELT MAT WINDING MACHINE

Joseph F. Stephens, Kansas City, Mo., assignor to Gustin-Bacon Manufacturing Company, Kansas City, Mo., a corporation of Missouri Application April 27, 1954, Serial No. 425,837

11 Claims. (Cl. 242—67.1)

My invention relates to a horizontal belt mat winding machine and more particularly to an improved machine for winding lengths of mats formed of glass fibers upon mandrels preparatory to making pipe coverings or insulated ducts.

In copending application of Joseph F. Stephens and Glenn W. Kerr, Serial No. 318,856, filed November 5, 1952, now Patent No. 2,778,759, there is shown a thermal pipe insulation and method of making the same in which mats of glass fibers are impregnated with a binder and then wound upon themselves around mandrels to form hollow cylinders. The hollow cylinders thus formed are molded by curing the binder.

In copending application of Joseph F. Stephens et al., Serial No. 346,082, now Patent No. 2,742,240, there is shown a mat winding machine in which an empty mandrel is first carried to a mat winding position by a pair of arms. After this a swingably mounted roll positions a wrapping belt around the mandrel while carried by the mandrel arms. This mat winding machine works very well in practice and does an excellent job. Its cycle time, however, is somewhat long for rapid production, since the mandrel must be transported from a feeding station to a wrapping station, back to the feeding station and then be removed and replaced by another mandrel.

One object of my invention is to provide an improved mat winding machine in which the winding belt is horizontally positioned whereby it may act successively to convey a mat to the mandrel to be wound, to wind the mat about the mandrel and then to convey the wrapped mandrel to a discharge means.

Another object of my invention is to provide a horizontally-positioned belt mat winding machine in which mandrels are automatically fed from a feeding station to a wrapping station and then automatically conveyed from the machine successively in continuous cyclic operations.

Another object of my invention is to provide an improved mat winding machine of simplified construction which has a high rate of operation.

Other and further objects of my invention will appear from the following description.

In general my invention contemplates the provision of a mandrel storage station from which mandrels are fed in succession to a winding station. An escapement-type latch releases one mandrel at a time to be driven to the loading station. A guide track is provided for directing the mandrel to its loading station. I provide a motor driven mandrel drive means for impelling the mandrel to move to its loading position. In its movement to the loading position, the mandrel engages a horizontally-positioned portion of a belt which is constantly being driven by an appropriate prime mover. The belt is mounted on a plurality of rollers. A movable pocket forming roll is adapted to coact with a fixed roll and the mandrel to form a pocket of the belt extending around the major portion of the mandrel. I provide means for carrying the movable pocket forming roll past the substantially vertical mandrel guide track to form the belt pocket. After the pocket is formed the green mat, impregnated with a binder, is fed to the mandrel pocket and wrapped around the mandrel by the belt. When this operation is completed, the mandrel drive means is reversed to permit the belt section to assume its horizontal position under the influence of a tensioning weight. The belt then carries the wrapped mandrel out of the guide to a suitable wrapped mandrel removing means. The entire cycle of operation is under the automatic control of a control circuit. The belt acts first to convey the green mat to the wrapping station, then to wrap the mat about the mandrel and finally to eject the mandrel from its wrapping station and convey it from the machine to a discharge point.

In the accompanying drawings which form part of the instant specification and which are to be read in conjunction therewith and in which like reference numerals are used to indicate like parts in the various views:

Figure 1 is a diagrammatic view of a horizontal belt mat winding machine showing one embodiment of my invention.

Figure 2 is a schematic view showing the parts of the mandrel in mat winding position.

Figure 3 is a schematic view similar to Figure 2 showing the parts in position with the belt conveying the wrapped mandrel to a wrapped mandrel removing means.

Figure 4:
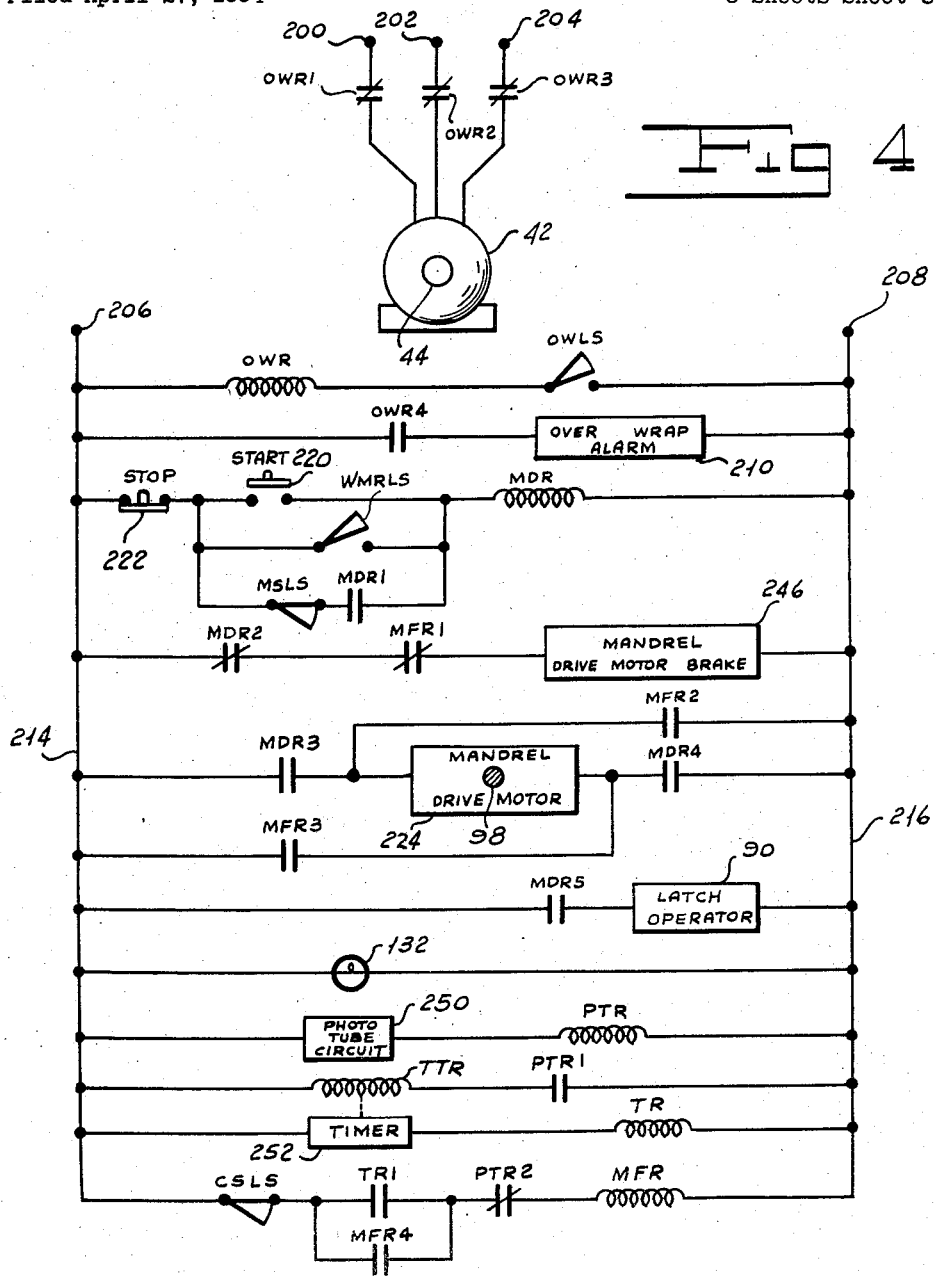
Figure 4 is a schematic or diagrammatic view showing the control means for my horizontal belt mat winding machine.

More particularly referring now to Figure 1, my machine may be supported upon any appropriate frame, indicated generally by the reference numeral 10. Mounted upon the frame in suitable bearings are a plurality of fixed center belt rollers. Upper rollers 12 and 14, mounted in bearings 16 and 18, are positioned so that a belt 20 may be generally substantially horizontal. A second pair of fixed center rollers 22 and 24 are positioned with their centers below and somewhat inboard of the fixed center rollers 12 and 14. A third pair of fixed center rollers 26 and 28 are carried by the frame at any convenient point inboard of the fixed center rollers 22 and 24. A tensioning roller 30 is provided with a shaft 32 by which a weight 34 is carried through links 36. It will be observed that the three pairs of fixed center rollers just described will support the belt 20 so that the weight 34 will extend a portion of the belt between the pair of fixed center rollers 12 and 14 in a substantially horizontal plane.

One of the fixed center rollers, as for example the fixed center roller 22, is formed with a shaft 38 to which a pinion 40 is secured. A motor 42 is provided with a shaft 44 carrying a driving pinion 46. The pinions 46 and 40 are connected by a driving chain 48. The arrangement is such that when the motor 42 rotates it will drive the roller 22 in a clockwise direction as viewed in Figure 1 to move the horizontal portion of the belt in the direction of the arrows in Figure 1. It is to be understood, of course, that any appropriate drive for the belt may be employed. If a low density winding is desired, it will be necessary to use a smaller belt tensioning weight 34. In such case I have found it advantageous to drive more than one roller as, for example, rollers 12 and 26 in addition to roller 22. Intermediate the upper pair of fixed center rollers 12 and 14, I provide a fixed pocket forming roller 50 and a movable pocket forming roller 52. The movable pocket forming roller 52 is carried upon an axle 54. This axle is normally supported on a pair of tracks 56 and positioned by a pair of bell cranks 58 which are rotatably carried by the frame upon a shaft 60. Each of the bell cranks 58 is biased to rotate in a clockwise direction as viewed in Figure 1 by a spring 57. Each of the bell cranks has one of its arms formed with a slot 62 embracing one of the respective ends of movable roll shaft 54. Each of the other arms of the bell cranks 58 is formed with a cam 64. A pair of inclined rails 66 carry a plurality of mandrels 68. Each of the mandrels is formed with a shaft 70, the ends of which rest upon the inclined rails 66. Each of the inclined rails terminates in a substantially vertically directed guideway 72. Each of the guideways 72 is formed by a pair of vertical members 74 and 76. The lower ends of the guideways 72 terminate in a bearing 78 in which a mandrel shaft 70 is adapted to seat. The members 76 are formed with cutaway portions 80 through which the mandrel shafts 70 are adapted to pass when a wrapped mandrel is being removed, as will be pointed out more fully hereinafter. Supported by the frame in any appropriate manner, I provide an escapement-type latch, indicated generally by the reference numeral 82. The latch has an upper member 84 and a lower member 86. The arrangement is such that when the upper member 84 is to the left, the lower member will be to the right and when the lower member 86 is to the left, the upper member 84 will be to the right. The members 84 and 86 are adapted successively to engage the ends of the mandrel shafts 70. It is to be understood that there are two latches 82, one for each of the guideways 72. Each of the lower latch arms 86 is normally urged to the left by springs 88. The lower arms 86 are adapted to be pulled to the right against the action of springs 88 by an appropriate operator, such as solenoid 90, as will be pointed out more fully hereinafter. Mounted in appropriate guideways 92 carried by the frame, I provide a pair of mandrel drive racks 94 adapted to be driven by a pair of mandrel drive rack pinions 96 secured to a shaft 98 of a mandrel drive motor (not shown). The mandrel drive shaft is adapted to be immobilized by a brake. I provide a control for my mandrel drive motor so that the racks 94 which are interconnected by a cross member 100 are adapted to be reciprocated through the reversal of the mandrel drive motor, which rotates the mandrel drive pinions 96. Appropriate limit switches are provided to stop the mandrel drive motor in each of its extreme positions. Whenever the mandrel drive motor is stopped, the mandrel drive racks 94 are immobilized through the braking of the mandrel drive motor shaft. The lower end of each mandrel drive rack 94 carries a roller 102 which is adapted to engage the cam 64 of a respective bell crank 58. The end of each mandrel drive rack 94 also carries a pivoted pawl 104. A respective spring 106 normally urges each pawl 104 to rotate in a counterclockwise direction to the position shown in Figure 1. It will be observed that the end of each pawl 104 is provided with a downwardly curved portion adapted to embrace a mandrel shaft adjacent its upper and right-hand portion as viewed in Figures 1, 2 and 3.

An inclined runway 120 is carried by the frame adjacent the upper portion thereof. Wrapped mandrels are adapted to roll down the inclined runway to a removal conveyor (not shown). The belt of a feeding conveyor 122 carrying a mat 124 to be wrapped passes around a stationary center roller 126 positioned adjacent the fixed center roll 12 of my mat winding machine. A photoelectric tube 128 is positioned above the space between the end of mat feeding conveyor 122 and the left-hand portion of my machine. Below this interspace I position a housing 130 for an incandescent lamp 132. The arrangement is such that the beam of light from the lamp 132 to the photoelectric tube 128 will be interrupted when a mat passes from the feeding conveyor 122 to the belt 20 of my machine.

Carried by any appropriate stationary support above my machine I position a cyclic stopping limit switch CSLS. Carried by the frame of my machine adjacent the bearing 78 at the bottom of guideway 72 I provide a mandrel seating limit switch MSLS. Over the inclined runway 120 and in a position adapted to be contacted by a shaft 70 of a mandrel upon which a mat has been wrapped, I provide a wrapped mandrel removal limit switch WMRLS. Carried by the frame of the machine and shown in Figure 2 adjacent bearing 78, I provide an overwrap limit switch OWLS. The purpose of the overwrap limit switch is to stop the belt driven motor in the event that a mat of too great a length is fed to the mandrel. Such a mat might increase the size of the pocket to such an extent that the tensioning roll 30 might be pulled upwardly to jam between the fixed center rolls 26 and 28. To preclude this possibility, I provide the safety feature of an overwrap limit switch.

It will be observed that the horizontal plane of the tracks 56 intersects the vertical plane of the guideways 72. Since the mandrel shaft 70 must pass to the bearing 78 below the plane of the tracks 56, these tracks must stop to the right of the guideway 72 as viewed in Figures 1, 2 and 3. It will be observed that the left-hand pocket forming roll 50 is mounted in adjustable bearings 51 adapted to be adjustably positioned by screws 53'. The adjustable fixed center of rotation of fixed pocket forming roll 50 is to the left of the vertical guideway 72. I have discovered that the center of the mandrel upon which the mat is to be wound cannot be permitted to float. The mandrel center must be fixed if a smooth wrapping operation is to occur and if a satisfactorily wrapped tubular product is to be obtained. For this reason, I have provided the bearings 78 for supporting the mandrel shafts 70 for rotation about a fixed center at the bottom of the guideways 72. It is to be understood, of course, that Figure 1 is diagrammatic. In practice the bearings 78, instead of being bushings as shown, may take the form of a plurality of rollers or any other desired type of bearing. It is essential, furthermore, that the incoming mat be fed to the space between the belt of the bare mandrel downwardly and at an angle in order to obtain proper feeding between the belt and the mandrel. It is for this reason that the fixed pocket forming roll 50 is positioned upwardly and to the left of the mandrel supporting bearing 78. A portion of the pocket will be formed by the belt passing around the mandrel and extending upwardly and to the left around the fixed pocket forming roll 50. This can readily be seen by reference to Figure 2 in which a portion of the belt 21 extends downwardly and to the right from the fixed adjustable center roll 50 to the mandrel 68 in position in the bearing 78.

In order that the belt pass around the major portion of the surface of the mandrel and thus form a pocket of the belt substantially surrounding the mandrel, it is necessary that the movable pocket forming roll 52 be moved from its position in Figure 3 to the position shown in Figure 2. As the bell cranks 58 are rotated in a counterclockwise direction against the action of springs 57, the slot 62 in each of the bell cranks will carry the ends of shaft 54 to the left along tracks 56 until the ends of shaft 54 seat in the bearings 53 formed at the bottom of the slots 62. When this occurs, the shaft 54, and hence the movable pocket forming roll 52, will be supported by the bell cranks 58. Further clockwise rotation of the bell cranks will carry the movable pocket forming roll 52 to the left of the vertical guideways 72 to the position shown in Figure 2. In this position the mandrel 68 will be driven by the belt 20 to rotate the mandrel in a counterclockwise direction as viewed in Figures 1, 2 and 3. The left-hand portion of the belt 20 will feed a mat 124 from the conveyor belt 122 to the downwardly inclined portion 21 and thus feed the belt into the belt pocket and between the belt portion 21 and the mandrel. This permits the wrapping operation to take place. Since the position of the shaft 54 of the movable pocket forming roll 52 is determined by the interaction of the rack roller 102 and the bell crank cam 64, I rely upon the adjusting screw 53' to change the belt pocket opening when adjustment is required for mats of different thicknesses.

Referring now to Figure 4 in which I show one form of control circuit for controlling the operation of my machine, the belt drive motor 42 may advantageously be a three-phase induction motor to which current is supplied from mainline conductors 200, 202 and 204. These mainline conductors are adapted to be interrupted by the opening of normally closed relay switches OWR1, OWR2 and OWR3. These relay switches are under the control of an overwrap relay winding OWR. The arrangement is such that when the winding OWR is energized the switches OWR1, OWR2 and OWR3 are opened. The control circuit is energized from a pair of terminals 206 and 208 which may be connected to any appropriate source of potential (not shown). The relay winding OWR is adapted to be energized whenever normally open overwrap limit switch OWLS is closed. The energization of the overwrap relay winding OWR opens normally closed relay switches OWR1, OWR2 and OWR3 and simultaneously closes normally open relay switch OWR4. The closing of switch OWR4 places overwrap alarm device 210 across the control conductors 214 and 216 which are connected to terminals 206 and 208, and thus actuates the overwrap alarm 210. This alarm may be either visual or oral, or both.

A mandrel drive relay winding MDR is adapted to be connected across the control conductors 214 and 216 by a start button 220 whenever it is desired to initiate the operation of my mat winding machine. As will be described more fully hereinafter, my control circuit will automatically recycle the machine as long as green mats to be wrapped are fed to the machine. If it is desired to stop the machine, the stop button 222 may be actuated to interrupt the circuit across mandrel drive relay winding MDR. The mandrel drive racks 94 are adapted to be driven downwardly by the mandrel drive pinions 96, which are in turn secured to and rotated by shaft 98, which is driven by a mandrel drive motor indicated by the reference numeral 224 in Figure 4. The mandrel drive motor shaft 98 is normally immobilized by a mandrel drive motor brake indicated in Figure 4 by the reference numeral 246. This mandrel drive motor brake may be of any appropriate construction, and is such as to be set by a solenoid energized by the closing of normally closed switches MDR2 and MFR1, which are connected in series with the mandrel drive motor brake operator across conductors 214 and 216. When either switch MDR2 or MFR1 is opened, the mandrel drive motor brake is released. When both switches are closed, the mandrel drive relay brake is set, and this immobilizes the mandrel feed racks 94 in the position they occupy at the moment the brake is set. It will be observed that the stop button 222 has an armature normally completing the circuit through mandrel drive relay winding MDR. When the start button is released, the circuit through winding MDR may be maintained by the shunt circuit comprising mandrel seating limit switch MSLS and holding mandrel drive relay switch MDR1 in series. It will be observed that switch MDR1 is a normally open switch. It is, however, adapted to be closed whenever the relay winding MDR is energized. The mandrel seating limit switch is a normally closed switch. Accordingly, as soon as winding MDR is energized by the actuation of the starting button 220, the shunt holding circuit will be established by way of the stop button 222, the normally closed limit switch MSLS, and the now-closed holding switch MDR1. This circuit will continue to be energized until the mandrel seating limit switch is opened. The circuit can be re-established by the closing of normally open wrapped mandrel removal limit switch WMRLS, which is positioned to be closed by the wrapped mandrels leaving my machine.

The mandrel drive motor 224 is of the reversible type. Whenever the circuit through the mandrel drive motor is completed by the closing of normally open switches MDR3 and MDR4, the mandrel drive motor will run in one direction. Whenever the circuit through the mandrel drive motor is completed by the closing of normally open switches MFR2 and MFR3, the mandrel drive motor will run in the opposite direction. The mandrel drive motor may advantageously be a direct current motor. Such a motor may be conveniently reversed by reversing the armature current with respect to the field current as is well known in the art. The normally open switches MFR2 and MFR3 are under the control of the mandrel feed relay winding, as will be pointed out more fully hereinafter. The empty mandrels, it will be remembered, are fed under the control of an escapement type latch 82 which is operated by solenoid 90. Whenever the solenoid is de-energized, the spring 88 pushes the lower escapement arm 86 to the left, as viewed in Figures 1 and 3. Whenever the latch operator 90 is energized, the escapement latch arm 84 is pushed to the left while the lower latch arm 86 is pulled to the right. The latch operator is under the control of a normally open switch MDR5, which is adapted to be closed whenever the relay winding MDR is energized.

The incandescent lamp 132 is energized by current supplied from the control circuit by conductors 214 and 216. This incandescent lamp supplies the light which energizes the phototube circuit 250. This circuit is not shown in detail since it is known to the art and is such that whenever light from the lamp 132 falls on the phototube 128, the phototube relay winding PTR is not energized. Whenever the light beam from incandescent lamp 132 is interrupted, the de-energization of the phototube 128 will energize phototube relay winding PTR.

A timer relay TR is adapted to be energized a predetermined time after the normally open relay switch PTR1 is closed. The switch PTR1 will close whenever relay winding PTR is energized. The timer relay is normally de-energized and is placed across the control conductors 214 and 216 in series with a timer mechanism 252. A timer tripping relay TTR is adapted to actuate the timer 252. A predetermined time after the timer has been tripped, the timer mechanism will momentarily energize the timer relay winding TR.

It will be seen that the arrangement is such that whenever the light beam upon the phototube 128 is interrupted that a predetermined time thereafter the timer relay winding TR becomes momentarily energized and the timer mechanism which is tripped by the interruption of the light beam is set into operation. A predetermined time thereafter, the timing relay TR is momentarily energized.

The mandrel feed relay winding MFR is adapted to be connected across the control conductors 214 and 216 by the closing of normally open timer relay switch TR1 by means of a circuit including the normally closed cycle stopping limit switch CSLS and normally closed phototube relay switch PTR2 in series. The momentary closing of timing relay switch TR1 energizes the mandrel feed relay winding MFR. One of the switches closed by the energization of winding MFR is normally open switch MFR4. This is the holding switch to maintain winding MFR energized after normally open switch TR1 opens upon the de-energization of the timing relay winding TR.

In operation, let us assume that the belt driving motor 42 is operating and that the control conductors 214 and 216 are energized owing to the connection of terminals 206 and 208 to an appropriate potential source. Let us further assume that the mandrel feed racks 94 are in the upper position of Figure 1 and that an empty mandrel is supported by the latch arms 86 and that there is a supply of mandrels on the mandrel feed rails 66. The starting button 220 is actuated, energizing the mandrel drive relay winding MDR. When this occurs, normally open relay switches MDR1, MDR3, MDR4, and MDR5 will close. Normally closed mandrel drive motor brake switch MDR2 will open. Mandrel seating limit switch MSLS is normally closed. Accordingly, the closing of holding switch MDR1 will maintain the winding MDR energized. The opening of mandrel drive motor brake switch MDR2 will release the mandrel drive motor brake 246. The closing of relay switches MDR3 and MDR4 will energize the mandrel drive motor to actuate it to move the mandrel drive racks 94 downwardly. Simultaneously with the release of the mandrel drive motor brake and the energization of the mandrel drive motor, the mandrel latch solenoids 90 will be energized by the closing of the latch operator switch MDR5. It will be observed that as soon as the mandrel supporting arms 86 are withdrawn, the remaining mandrels will be supported by the latch arms 84. The mandrel which therefore rested in the feeding position will drop by gravity. Each mandrel feeding pawl 104, however, will remain in contact with the respective ends of the mandrel shaft 70, owing to the fact that the speed of the downward motion of racks 94 is greater than the speed which would be achieved by the mandrel falling freely. Hence, the mandrel drive rack pawls 104 will remain in engagement with the ends of the mandrel shaft past the mandrel guideways opening 80. The stretched horizontal belt 20 cushions the mandrel, and it immediately starts to rotate as soon as contact is made with the belt. As the rotating mandrel is driven downwardly, it commences to cup the belt. Slack is afforded for this cupping action by lifting of the belt tensioning weight 34. The rack rollers 102 engage the bell crank cams 64 and rotate the bell cranks in a counterclockwise direction as viewed in the drawings. This rotation of the bell cranks carries the movable pocket forming roller 52 to the left along its tracks 56 owing to the seating position of the ends of the axle 54 in the slots 62 of the bell crank arms. As the action continues, the shaft 70 of the mandrel will be driven below the plane of the tracks 56 and the ends of the axle 54 of the movable pocket forming roller 52 will be carried by the bearings 53 which are positioned at the bottom of the slots 62. Continued movement downwardly of the mandrel drive racks 94 will continue to rotate the bell cranks 58, thus carrying the movable pocket forming roller 52 to the left of the mandrel feeding guideways 72 to the position shown in Figure 2. The mandrel shaft ends, however, will at this time be seated in the bearings 78 which are positioned at the bottom of the vertical guideways 72. As the mandrel shaft seats, it opens the normally closed mandrel seating limit switch MSLS. This interrupts the holding circuit through the mandrel drive relay winding MDR. When this occurs, the normally open relay switches MDR1, MDR3, MDR4, and MDR5 resume their open positions while the normally closed relay switch MDR2 closes to re-establish the circuit through the mandrel drive motor brake, thus resetting the brake. The opening of switches MDR3 and MDR4 simultaneously stops the mandrel drive motor and the opening of switch MDR1 breaks the holding circuit through relay winding MDR so that when the mandrel seating limit switch MSLS closes, the circuit through winding MDR1 will not immediately be re-established. The deenergization of the solenoids 90 permits the springs 88 of respective latch assemblies 82 to move the latch arms 86 to the left to mandrel suptporting position. At the same time, the latch arms 84 are moved to the right permitting a mandrel to move by gravity to the position shown in Figures 1 and 3. It is to be understood, of course, that while I have shown the mandrel feeding guideways 72 as substantially vertical, these guideways may be inclined from the vertical, preferably with the upper ends of the guideways displaced to the left. This will assist the ends of pawls 104 in constraining the empty mandrels from being carried out of the guideways when first engaging the moving belt 20 on their way to the wrapping station.

It will be seen that the position of the parts is now that as shown in Figure 2. An empty mandrel has its shaft 70 seated in bearings 78 and is maintained in this position by the mandrel drive rack pawls 104. The pocket forming rolls 50 and 52 are adjacent each other so that the belt 20 is wrapped around a major portion of the periphery of the empty mandrel to form a pocket. The mandrel, of course, is being rotated by the belt in a counterclockwise direction. A green plastic-impregnated mat of glass fibers 124 or any other suitable mat to be wrapped about the mandrel is fed by conveyor 122 to the horizontal inlet portion of the belt 20. It will be observed that the belt 20 acts as a conveyor to convey the mat 124 to the belt pocket and thus to wrapping position. As the leading edge of the mat 124 passes underneath the photoelectric tube 128, it interrupts the beam from the incandescent light 132 and thus momentarily energizes the phototube relay winding PTR. When this occurs, the normally open relay switch PTR1 momentarily closes and energizes the timer tripping relay winding TTR. The mat is then wound around the empty mandrel by the belt in a rapid, convenient and expeditious manner. It will be observed that during the wrapping operation, the mandrel is supported on fixed centers by the bearings 78. The mandrel cannot be permitted to float, but must be supported for rotation on fixed centers during the wrapping operation. If the length of the mat 124 is of the proper predetermined length, it will be completely wrapped around the mandrel when the timer relay winding TR is energized. This occurs a predetermined time period after the time tripping relay winding TTR has been energized and is accomplished by the closing of a timing switch within the timer 252, thus momentarily energizing the timer relay winding TR. As soon as the winding TR is energized the normally open timer relay switch TR1 will close. This will energize mandrel feed relay winding MFR. The phasing of the operations is such that a second mat 124 will not be fed until the cycle is completed. If the mat is too long or if the time delay is too short, the light beam upon the phototube 128 will remain interrupted by the mat. In this event, the normally closed phototube relay switch PTR2 will remain open owing to the energization of relay winding PTR and while this switch PTR2 is in open position, the mandrel feed relay winding MFR cannot be energized.

Normally, however, as soon as the timer relay winding TR is energized, the mandrel feed relay winding MFR will be energized. The energization of mandrel feed relay winding MFR will close normally open relay switches MFR2, MFR3, and MFR4 and will open normally closed relay switch MFR1. The opening of switch MFR1 will release the mandrel drive motor brake. The closing of switch MFR4 will hold the circuit through relay winding MFR and maintain it in energized condition. The closing of switches MFR2 and MFR3 will energize the mandrel drive motor to rotate in the direction opposite from that in which it rotated in moving the mandrel to the wrapping position. The release of the brake and the reversal of the mandrel drive motor will move the mandrel drive racks 94 upwardly. The wrapped mandrel will be carried upwardly owing to the belt tension generated by gravity through weight 34. The upward movement of the racks 94 will be more rapid than the elevation of the wrapped mandrel by the belt. When the belt reaches its extended position as shown in Figures 1 and 3, the ends of the mandrel shaft 70 will be in register with the openings 80 in the mandrel guideways 72. This will permit the belt 20 to carry the wrapped mandrel to the right. It will be seen that not only does my horizontal belt act as a feeding conveyor to feed the mat to be wrapped, but it also acts as a discharge conveyor to carry the wrapped mandrel from the machine.

As the racks 94 move upwardly, a member 100 connecting the racks will open a normally closed cycle stopping limit switch CSLS. The opening of switch CSLS de-energizes the relay winding MFR and permits normally open relay switches MFR2, MFR3 and MFR4 to reassume their normally open positions. The opening of switches MFR2 and MFR3 de-energizes the mandrel drive motor. The opening of relay switch MFR4 interrupts the holding circuit through relay winding MFR so that when limit switch CSLS again closes, the winding MFR will not be immediately re-energized. It will also be observed that in the upward motion of the racks, the mandrel drive pawls 104 will engage the ends of the shaft 70 of the mandrel in feeding position. These pawls, however, will be permitted to pivot downwardly against the action of springs 106. The re-closing of normally closed relay switch MFR1 following the de-energization of relay winding MFR resets the mandrel drive motor brake.

The parts are now in a position to begin a new cycle. This new cycle is initiated when the wrapped mandrel leaves the horizontal belt 20 and rolls down the inclined discharge runway 120 for further treatment in a curing oven. At a convenient place along this wrapped mandrel removing path, I position a wrapped mandrel removal limit switch WMRLS. This normally open switch is connected in parallel with the start button 220. When the wrapped mandrel being removed momentarily closes this switch and re-establishes the circuit through mandrel drive relay winding MDR, the cycle is automatically repeated.

If for any reason I wish to stop the operation of the machine, I hold the stop button 222 downwardly until after a wrapped mandrel leaves the machine and actuates the limit switch WMRLS. While the stop button interrupts the circuit, the mandrel drive relay winding cannot be re-energized by either the start button or the closing of limit switch WMRLS.

It will be appreciated that the action of my machine is quite rapid. The empty mandrels can be fed very rapidly owing to the cushioning effect of the taut belt in horizontal position. The mat feeding and mat discharge conveyor portions of the belt can be quite short so that a minimum period of time is consumed in feeding the mat to wrapping position and in removing wrapped mandrels from the machine. The rapid action of my machine enables me to achieve a high production rate. The belt acts successively to feed the mat to the wrapping station to wrap the mat around the mandrel and as a discharge conveyor to convey wrapped mandrels from the machine. My machine is wholly automatic in its operation and accomplishes its various functions with a minimum of moving parts in a simple, convenient, expeditous and inexpensive manner.

It will be understood that certain features and subcombinations are of utility and may be employed without reference ot other features and subcombinations. This is contemplated by and is within the scope of my claims. It is further understood that various changes may be made in details within the scope of my claims without departing from the spirit of my invention. It is therefore to be understood that my invention is not to be limited to the specific details shown and described.

Having thus described my invention, what I claim is:

1. In a mat winding machine, a frame, a first belt supporting roller, a second belt supporting roller, means for mounting the belt supporting rollers on the frame in substantially the same horizontal plane with respective axes of rotation of the rollers displaced from each other, a mandrel upon which a mat is to be wound, means for supporting said mandrel in a fixed position on said frame below said horizontal plane, a pair of pocket forming rolls, means for mounting said pocket forming rolls on the frame between said belt supporting rolls and above said mandrel, an endless belt carried by said belt supporting rolls and said pocket forming rolls and extending around the major portion of the periphery of said mandrel, means for retaining said pocket forming rolls in a fixed pocket forming position during a winding operation, means for tensioning said belt and means for driving said belt, said mandrel supporting means supporting said mandrel against the action of said belt.

2. In a winding machine a plurality of rolls, an endless belt carried by the rolls, two of said rolls having their centers of rotation fixed and separated from each other along substantially a horizontal plane, means for rotatably supporting a mandrel in a fixed position below said plane against the action of said belt, another two of said plurality of rolls positioned above said mandrel supporting means and between said fixed rolls and adjacent to each other to form a pocket of the belt extending around the major portion of the periphery of the mandrel, means for retaining said other two rolls in a fixed pocket forming position during a winding operation, means for rotating one of said rolls to drive said belt and means for tensioning said belt.

3. In a winding machine a mandrel feeding station, a mat winding station fixedly positioned below said mandrel feeding station, a mat delivery station and a wound mandrel removing station, a fixed roll adjacent the mat delivery station, a second fixed roll adjacent the wound mandrel removing station, said fixed rolls lying in substantially the same horizontal plane, a pair of pocket forming rolls positioned between said first and second fixed rolls and above said mat winding station, an endless belt carried by said fixed rolls and pocket forming rolls and extending around the major portion of the periphery of said mandrel, means for retaining said pocket forming rolls in a fixed pocket forming position during a winding operation, means for tensioning said belt and means for driving the belt.

4. In a winding machine a substantially vertically positioned guide, a mandrel supporting means fixedly positioned adjacent the bottom of said guide, a pair of belt supporting rolls and a pair of pocket forming rolls positioned in substantially the same horizontal plane above said mandrel supporting means, said pocket forming rolls being positioned intermediate said belt supporting rolls, means for moving said pocket forming rolls relatively toward and away from each other, means for retaining said pocket forming rolls in a fixed pocket forming position during a winding operation, an endless belt carried by said belt supporting rolls and pocket forming rolls, means for driving said belt, means for tensioning said belt and means for moving a mandrel along said guideway between said pocket forming rolls to said mandrel supporting means whereby to form a pocket of said belt against the action of said tensioning means, said mandrel supporting means supporting a mandrel in position against the action of said belt.

5. In a winding machine, a pair of fixed belt supporting rolls spaced from each other and lying in substantially the same horizontal plane, an endless belt carried by said belt supporting rolls, means for driving said belt, means for tensioning said belt, a pair of pocket forming rolls positioned between said belt supporting rolls, means for mounting said pocket forming rolls for relative movement toward and away from each other, means for moving a mandrel downwardly between and below said pocket forming rolls to form a pocket of the belt below said horizontal plane against the action of said tensioning means, means for retaining said pocket forming rolls in a fixed position during a winding operation, means for supporting a mandrel in a fixed position below said horizontal plane against the action of said belt and means for moving the pocket forming rolls toward each other to bring the belt around the major portion of the periphery of the mandrel.

6. A winding machine as in claim 5 including in combination a substantially vertical guide positioned intermediate said belt supporting rolls for guiding said mandrel downwardly between said pocket forming rolls.

7. A winding machine as in claim 5 in which one of said pocket forming rolls is stationary and positioned to one side of the locus of downward travel of the mandrel to pocket forming position.

8. In a mat winding machine, a pair of belt supporting rolls spaced from each other and lying in substantially the same horizontal plane, an endless belt carried by the belt supporting rolls, means for driving said belt, means for tensioning said belt, a pair of pocket forming rolls positioned between belt supporting rolls, means for mounting said pocket forming rolls for relative movement toward and away from each other, a mandrel supporting bearing fixedly positioned below the plane of said belt, means for moving a mandrel downwardly between the pocket forming rolls to said mandrel supporting bearing to form a pocket of the belt against the action of said tensioning means, means for holding the mandrel in mat winding position on said bearing against the action of said tensioning means, means for moving the pocket forming rolls toward each other to bring the belt around the major portion of the periphery of the mandrel to form a pocket around the mandrel and means for retaining said pocket forming rolls in a fixed pocket forming position during a winding operation.

9. A mat winding machine as in claim 8 including means for feeding a mat to said pocket for wrapping around the mandrel, means responsive to the feeding of the mat for releasing said mandrel holding means to permit said tensioning means to raise said mandrel with a mat wound thereon and means for moving said pocket forming rolls away from each other.

10. A mat winding machine as in claim 8 including means responsive to the removal of a wound mandrel from the winding machine for initiating the action of the means for moving the mandrel downwardly to said mandrel supporting bearing.

11. A mat winding machine as in claim 8 including in combination means for successively feeding mandrels to said means for moving said mandrel downwardly and means responsive to the removal of wrapped mandrels from the machine for initiating the action of said means for moving the mandrel downwardly.

References Cited in the file of this patent

UNITED STATES PATENTS

| | | |
|---|---|---|
| 1,078,099 | Kremer | Nov. 11, 1913 |
| 1,282,236 | Kenworthy | Oct. 22, 1918 |
| 1,778,777 | Trinks et al. | Oct. 21, 1930 |
| 1,959,418 | Fourness | May 22, 1934 |
| 2,037,348 | Stein | Apr. 14, 1936 |
| 2,686,014 | Strassler | Aug. 10, 1954 |
| 2,742,240 | Stephens et al. | Apr. 17, 1956 |